United States Patent
Yamamoto et al.

(10) Patent No.: US 11,366,267 B2
(45) Date of Patent: Jun. 21, 2022

(54) OPTICAL FIBER

(71) Applicant: SUMITOMO ELECTRIC INDUSTRIES, LTD., Osaka (JP)

(72) Inventors: Yoshinori Yamamoto, Osaka (JP); Keisei Morita, Osaka (JP); Takemi Hasegawa, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/145,837

(22) Filed: Jan. 11, 2021

(65) Prior Publication Data

US 2021/0132291 A1 May 6, 2021

Related U.S. Application Data (63) Continuation of application No. PCT/JP2019/027591, filed on Jul. 11, 2019.

(30) Foreign Application Priority Data

Jul. 13, 2018 (JP) .............................. JP2018-133316

(51) Int. Cl.
   *G02B 6/036* (2006.01)
   *G02B 6/02* (2006.01)

(52) U.S. Cl.
   CPC ..... *G02B 6/03627* (2013.01); *G02B 6/03694* (2013.01); *G02B 6/02395* (2013.01)

(58) Field of Classification Search
   CPC ............ G02B 6/03627; G02B 6/03694; G02B 6/02395; G02B 6/0283; G02B 6/03611; G02B 6/03633; C03C 25/1065; C03C 2201/02; C03C 13/048; C03C 3/06; C03C 13/045; C03C 13/04
   See application file for complete search history.

(56) References Cited

U.S. PATENT DOCUMENTS

| 9,618,692 B2 | 4/2017 | Berkey et al. |
| 9,851,499 B2 | 12/2017 | Bookbinder et al. |
| (Continued) | | |

FOREIGN PATENT DOCUMENTS

| JP | 2002-148465 A | 5/2002 |
| JP | 2007-052458 A | 3/2007 |
| (Continued) | | |

OTHER PUBLICATIONS

Miller, S. E., Chynoweth, A. G., "Optical fiber telecommunications," Academic Press, New York, Oct. 28, 1979, p. 186-p. 191.

*Primary Examiner* — John Bedtelyon
(74) *Attorney, Agent, or Firm* — Faegre Drinker Biddle & Reath LLP (57) ABSTRACT

An optical fiber according to an embodiment includes a core and a cladding. The average value n1_ave of the refractive index of the core, the minimum value nc_min of the refractive index of the cladding, and the refractive index n0 of pure silica glass satisfy relationships of n1_ave>nc_min and nc_min<n0. The cladding contains fluorine. The fluorine concentration in the cladding is adjusted to be minimum in the outermost portion of the cladding including the outer peripheral surface of the cladding.

16 Claims, 10 Drawing Sheets

(56) References Cited

U.S. PATENT DOCUMENTS

| | | |
|---|---|---|
| 2002/0031320 A1* | 3/2002 | Nagayama ............ C03B 37/029 385/127 |
| 2009/0180103 A1 | 7/2009 | Kim et al. |
| 2011/0044596 A1 | 2/2011 | Zhang et al. |
| 2013/0148934 A1 | 6/2013 | Nakanishi et al. |
| 2018/0079677 A1 | 3/2018 | Bookbinder et al. |

FOREIGN PATENT DOCUMENTS

| | | |
|---|---|---|
| JP | 2009-168813 A | 7/2009 |
| JP | 2013-122502 A | 6/2013 |
| JP | 2014-118334 A | 6/2014 |

\* cited by examiner

OPTICAL FIBER

CROSS-REFERENCE TO RELATED APPLICATIONS

This application is a continuation application of PCT/JP2019/027591 claiming the benefit of priority of the Japanese Patent Application No. 2018-133316 filed on Jul. 13, 2018, the entire contents of which are incorporated herein by reference.

TECHNICAL FIELD

The present disclosure relates to an optical fiber.

BACKGROUND ART

In an optical transmission system using an optical fiber as a transmission line, increase in the transmission distance and the transmission capacity has been demanded. In order to satisfy such a demand, a small transmission loss of the optical fiber is desired. In the drawing process of manufacturing an optical fiber by drawing an optical fiber preform, since tension is applied to the optical fiber preform softened by heating to perform drawing, a stress parallel to the applied tension remains in a glass portion of the manufactured optical fiber. The glass portion of the optical fiber is constituted by a core and a cladding, and most of the power of the signal light propagating in the optical fiber is concentrated in the core. If a tensile stress remains in the core, the residual tensile stress increases glass structural defects in the core, which increases the transmission loss. Therefore, it is desirable that a compressive stress remains in the core.

Patent Document 1 discloses an optical fiber in which the stress in the core is a compressive stress. In the optical fiber disclosed in Patent Document 1, since the core contains an alkali metal element, the viscosity of the core decreases, and the stress in the core is a compressive stress. In the optical fiber disclosed in Patent Document 1, the cladding contains fluorine (a fluorine element) and chlorine (a chlorine element), but the distribution of the fluorine concentration in the cladding is not considered at all.

In addition, Patent Document 2 also discloses an optical fiber in which the stress in the core is a compressive stress. In the optical fiber disclosed in Patent Document 2, since the core contains $GeO_2$ and the optical fiber obtained immediately after an optical fiber preform is drawn at an appropriate drawing speed and drawing tension passes through a heating furnace having an appropriate length, the stress in the core is a compressive stress. The glass portion of the optical fiber disclosed in Patent Document 2 includes a central core, an optical cladding, and a jacket. However, the outermost jacket is pure silica glass or silica glass containing chlorine and does not contain fluorine that reduces the refractive index of the glass material.

CITATION LIST

Patent Literature

Patent Document 1: Japanese Patent Application Laid-Open No. 2014-118334
Patent Document 2: Japanese Patent Application Laid-Open No. 2013-122502
Patent Document 3: Japanese Patent Application Laid-Open No. 2009-168813

SUMMARY OF INVENTION

An optical fiber according to the present disclosure includes at least a core mainly comprised of silica glass and a cladding mainly comprised of silica glass. The core extends along the fiber axis (the central axis of the optical fiber). The cladding surrounds the outer peripheral surface of the core and has a refractive index lower than the refractive index of the core. An average value $n1\_ave$ of the refractive index of the core, a minimum value $nc\_min$ of the refractive index of the cladding, and a refractive index $n0$ of pure silica glass satisfy relationships of:

$n1\_ave > nc\_min$; and $nc\_min < n0$.

Furthermore, the cladding contains fluorine (a fluorine element), and the fluorine concentration in the cladding is adjusted to be minimum in the outermost portion of the cladding.

DESCRIPTION OF EMBODIMENTS

Description of Embodiment of Present Disclosure

A purpose of the present disclosure is to provide a low loss optical fiber capable of being manufactured inexpensively and easily. First, the details of the embodiment of the present disclosure are individually listed and described.

(1) As one aspect of the present disclosure, the optical fiber includes at least a core mainly comprised of silica glass and a cladding mainly comprised of silica glass. The core extends along the fiber axis (the central axis of the optical fiber). The cladding surrounds the outer peripheral surface of the core and has a refractive index lower than the refractive index of the core. An average value $n1\_ave$ of the refractive index of the core, a minimum value $nc\_min$ of the refractive index of the cladding, and a refractive index $n0$ of pure silica glass satisfy relationships of:

$n1\_ave > nc\_min$; and $nc\_min < n0$.

Furthermore, the cladding contains fluorine (a fluorine element), and the fluorine concentration in the cladding is adjusted to be minimum in the outermost portion of the cladding. Note that, an "outermost portion of a cladding" in this specification means an annular region from a position where a distance along a radial direction from an inner peripheral surface of the cladding is 80% of the width of the cladding to an outer peripheral surface of the cladding.

(2) As one aspect of the present disclosure, a fluorine concentration XFc_outer[ppm] in the outermost portion of the cladding and a maximum value XFc_max[ppm] of the fluorine concentration in the cladding preferably satisfy a relationship of:

$$0 \leq XFc\_outer < 0.8 \times XFc\_max.$$

Here, a "concentration" is expressed as a "mass fraction" (mass of each component with respect to the total mass) in the present disclosure.

(3) As one aspect of the present disclosure, in any small section in an outer region of the cladding, a differential coefficient XF'(r) of a fluorine concentration distribution XF(r) in the cladding at a distance r is preferably negative, and an absolute value of the differential coefficient XF'(r) is preferably 30 ppm/μm or more and 600 ppm/μm or less. Note that, the fluorine concentration distribution XF(r) in the cladding is determined by the fluorine concentration in the cladding and the distance r along a radial direction of the optical fiber from the fiber axis in a cross section of the optical fiber perpendicular to the fiber axis. The outer region of the cladding is defined as an annular region from a position where a distance along the radial direction from an inner peripheral surface of the cladding is 50% of a width of the cladding to a position where a distance along the radial direction from the inner peripheral surface is 80% of the width of the cladding. Furthermore, the any small section included in the outer region of the cladding has a width of 1 μm defined along the radial direction.

(4) As one aspect of the present disclosure, a stress acting perpendicularly to the cross section perpendicular to the fiber axis in the outer region of the cladding is preferably a tensile stress. As one aspect of the present disclosure, the optical fiber preferably has an effective area of 80 μm$^2$ or more and 160 μm$^2$ or less at a wavelength of 1550 nm. Furthermore, as one aspect of the present disclosure, the optical fiber preferably has a cable cutoff wavelength of 1530 nm or less.

(5) As one aspect of the present disclosure, the core preferably contains GeO$_2$. As one aspect of the present disclosure, the core may contain chlorine (a chlorine element). Note that, as one aspect of the present disclosure, a chlorine concentration XCl_outer[ppm] in an outermost portion of the core and a maximum value XCl_max[ppm] of the chlorine concentration in the core preferably satisfy a relationship of:

$$0 \leq XCl\_outer < 0.8 \times XCl\_max.$$

Furthermore, as one aspect of the present disclosure, the core preferably contains GeO$_2$ and chlorine, an average value of a concentration of the GeO$_2$ contained in the core is preferably 33000 ppm or less, and an average value of a concentration of the chlorine contained in the core is preferably 20000 ppm or less.

(6) As one aspect of the present disclosure, the core may contain fluorine. As one aspect of the present disclosure, a relative refractive index difference Δcore of an average value of refractive index of the core with respect to pure silica glass is preferably −0.2% or more and +0.4% or less. Furthermore, as one aspect of the present disclosure, a relative refractive index difference Δ1 of the average value of refractive index of the core with respect to a minimum refractive index of the cladding is preferably 0.1% or more and 0.5% or less. As one aspect of the present disclosure, an exponent α of a refractive index profile of the core is 1 or more and 10 or less.

(7) As one aspect of the present disclosure, the optical fiber may include a depressed portion provided between the core and the cladding. As one aspect of the present disclosure, an average value n2_ave of a refractive index of the depressed portion preferably satisfies a relationship of:

$$n2\_ave \leq nc\_min.$$

As one aspect of the present disclosure, a relative refractive index difference Δ+ of the average value of refractive index of the core with respect to the depressed portion is preferably 0.2% or more and 0.5% or less. Furthermore, as one aspect of the present disclosure, a relative refractive index difference Δ2 of an average value of refractive index of the depressed portion with respect to the minimum refractive index of the cladding is preferably −0.16% or more and −0.02% or less. In addition, a ratio r2/r1 of a radius r2 of the depressed portion to a radius r1 of the core is preferably 2.0 or more and 7.0 or less.

Each aspect listed in [Description of Embodiment of Present Disclosure] is applicable to each of the other aspects or all combinations of the other aspects. The optical fiber in the present disclosure can be manufactured inexpensively and easily and reduce the transmission loss.

Description of Embodiment of Present Disclosure

Hereinafter, a specific configuration of an optical fiber according to the present disclosure is described in detail with reference to the attached drawings. Note that, the present invention is not limited to examples to be described, is represented by claims, and includes all modifications within the meaning and scope equivalent to claims. In the description of the drawings, identical elements are denoted by the same reference signs, and overlapped descriptions are omitted.

In the optical fiber disclosed in Patent Document 1, since an alkali metal element is doped to the core the manufacturing cost increases. In the optical fiber disclosed in Patent Document 2, it is necessary to dope GeO$_2$ to the core to increase the refractive index of the core in order to confine the signal light in the core. However, if the concentration of GeO$_2$ is high, the Rayleigh scattering due to fluctuation in the concentration of GeO$_2$ increases, and the transmission loss increases. In addition, in order to manufacture the optical fiber disclosed in Patent Document 2, the cost of installing a heating furnace is required, and the length and drawing speed of the heating furnace must be appropriately set, but there is a limit to the increase in the drawing speed.

Figure 1:
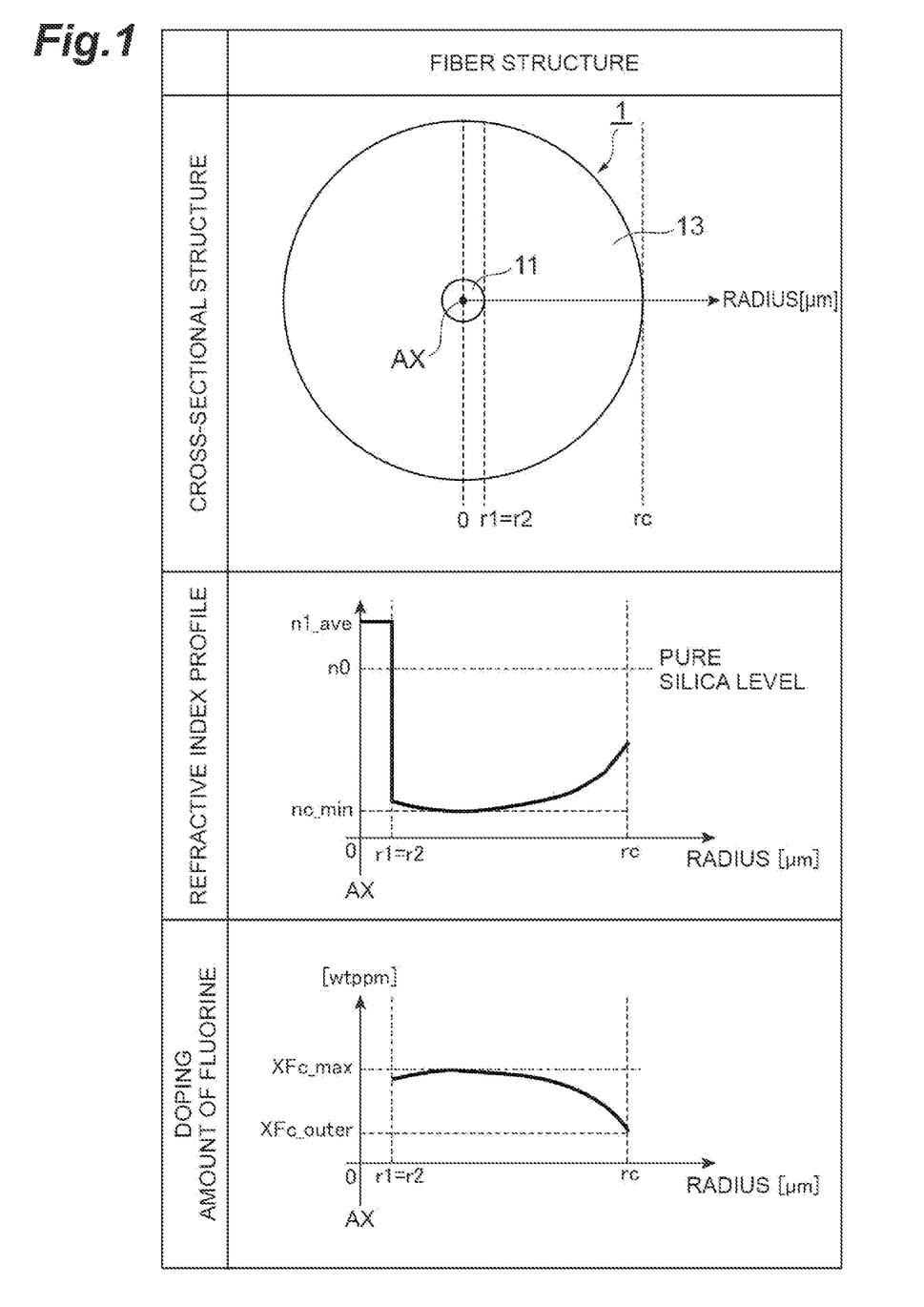
FIG. 1 is a diagram showing a configuration of an optical fiber 1.

FIG. 1 is a diagram showing a configuration of an optical fiber 1. FIG. 1 shows a structure of the optical fiber 1 in a cross section perpendicular to a fiber axis AX (central axis), a refractive index profile along a radial direction from the fiber axis AX as the center, and a fluorine concentration distribution along the radial direction. The optical fiber 1 includes a core 11 having a radius r1 extending along the fiber axis AX, and a cladding 13 having a radius rc and surrounding the outer peripheral surface of the core 11. The core 11 and the cladding 13 each mainly comprised of silica glass. The refractive index of the core 11 is higher than the refractive index of the cladding 13. An average value n1_ave of the refractive index of the core 11, a minimum value nc_min of the refractive index of the cladding 13, and a refractive index n0 of pure silica glass satisfy, in the optical fiber 1 (the core 11 and the cladding 13), relationships represented by the following expressions (1) and (2):

$$n1\_ave > nc\_min \quad (1); \text{ and}$$

$$nc\_min < n0 \quad (2).$$

Figure 2:
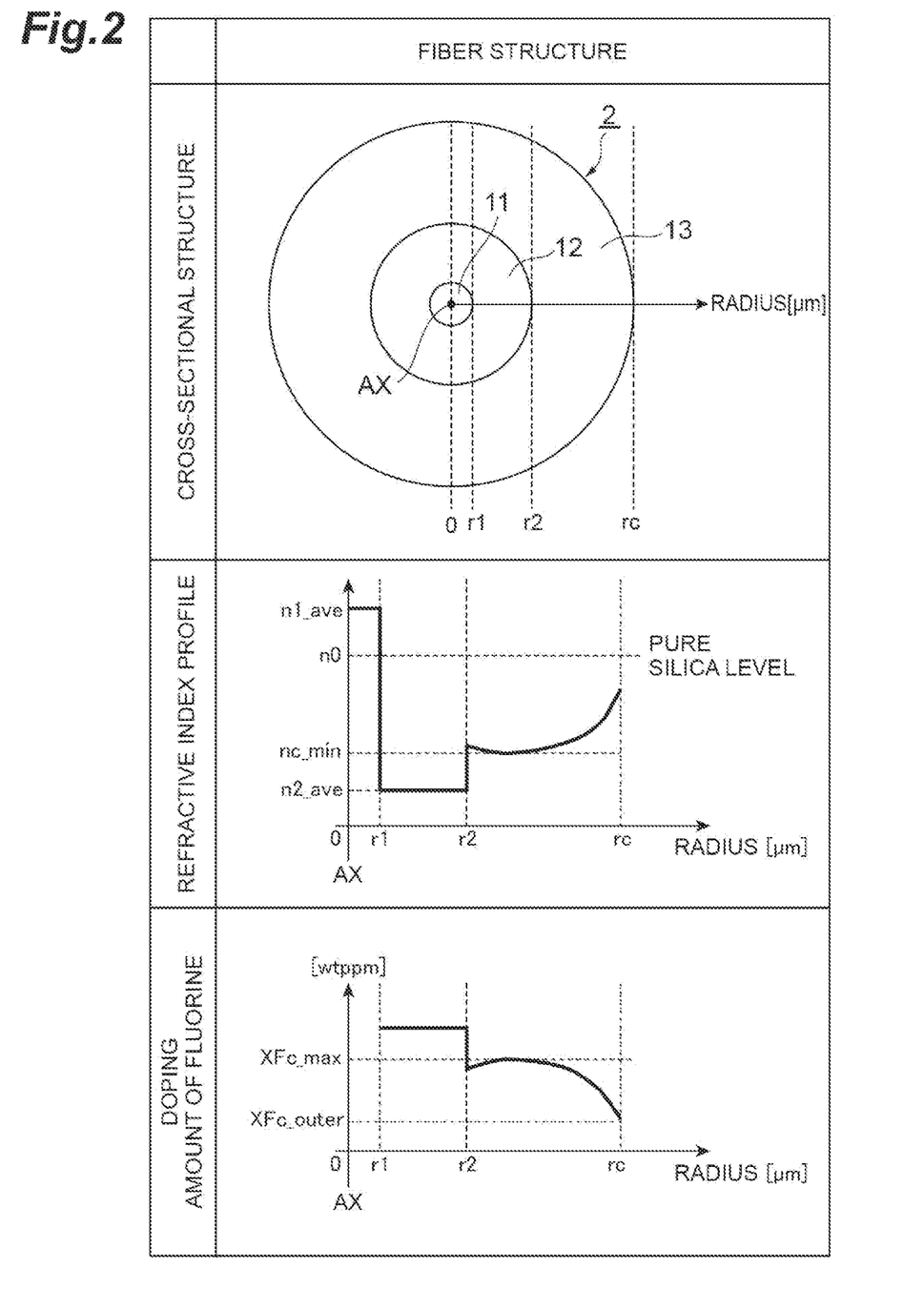
FIG. 2 is a diagram showing a configuration of an optical fiber 2.

FIG. 2 is a diagram showing a configuration of an optical fiber 2. FIG. 2 shows a structure of the optical fiber 2 in a cross section perpendicular to the fiber axis AX (central axis), a refractive index profile along the radial direction from the fiber axis AX as the center, and a fluorine concentration distribution along the radial direction. The optical fiber 2 includes a core 11 having a radius r1 extending along the fiber axis AX, a depressed portion 12 having a radius r2 and surrounding the outer peripheral surface of the core 11, and a cladding 13 having a radius rc and surrounding the outer peripheral surface of the depressed portion 12. The optical fiber 2 includes the depressed portion 12 provided between the core 11 and the cladding 13. The core 11, the depressed portion 12, and the cladding 13 each mainly comprised of silica glass. The refractive index of the core 11 is higher than the refractive index of the cladding 13. The refractive index of the depressed portion 12 is lower than the refractive index of the cladding 13. An average value n2_ave of the refractive index of the depressed portion 12 in the optical fiber 2 (the core 11, the depressed portion 12, and the cladding 13) satisfies, in addition to the relationships represented by the above expressions (1) and (2), the following expression (3):

$$n2\_ave \leq nc\_min \quad (3).$$

The optical fiber 1 (FIG. 1) corresponds to the structure in which r2 equals to r1 in the optical fiber 2 (FIG. 2) (the structure in which the depressed portion 12 is removed). Each of the radii r1 and r2 is determined as a value when the differential coefficient of the refractive index at the distance r along the radial direction from the fiber axis AX is minimum or maximum.

In each of the optical fiber 1 (FIG. 1) and optical fiber 2 (FIG. 2), the cladding 13 contains fluorine. The fluorine concentration in the cladding 13 is adjusted to be minimum in the outermost portion. The "outermost portion" is an annular region including the outer peripheral surface of the cladding 13 and positioned outside the position where the distance along the radial direction from the inner peripheral surface of the cladding 13 (the position of r2 in each of FIGS. 1 and 2) is 80% of the width of the cladding (rc−r2). Silica glass has higher viscosity as the fluorine concentration is smaller. Therefore, the tension applied to the glass in the drawing process is mainly borne by the vicinity of the outermost portion of the cladding 13, and the tension applied to the core is relatively small. As a result, a tensile stress acting perpendicular to the cross section perpendicular to the fiber axis remains in the vicinity of the outermost portion of the cladding 13. However, since the stress in the core in which most of the power of the signal light propagating in the optical fiber is present can be a compressive stress, the transmission loss of the optical fiber as a whole can be controlled to be low.

When the end face of the optical fiber 1 or the optical fiber 2 is fusion-spliced to the end face of another optical fiber, the end portion of the optical fiber is cleaved. At this time, a small fluorine concentration in the outermost portion of the cladding 13 of the optical fiber 1 or the optical fiber 2 makes the cleaving of the optical fiber easy. That is, it is possible to obtain a cleaved surface that is more perpendicular to the fiber axis AX and is flatter.

A fluorine concentration XFc_outer[ppm] in the outermost portion of the cladding 13 and a maximum value XFc_max[ppm] of the fluorine concentration in the cladding 13 satisfy a relationship represented by the following expression (4):

$$0 \leq XFc\_outer < XFc\_max \quad (4).$$

In addition, it is preferable that they satisfy a relationship represented by the following (5):

$$0 \leq XFc\_outer < 0.8 \times XFc\_max \quad (5).$$

It is more preferable that they satisfy a relationship represented by the following expression (6):

$$0 \leq XFc\_outer < 0.5 \times XFc\_max \quad (6).$$

Furthermore, it is most preferably that they satisfy a relationship represented by the following expression (7):

$$0 \leq XFc\_outer < 0.3 \times XFc\_max \quad (7).$$

By satisfying the relationships represented by the above expressions (4) to (7), the viscosity of glass in the outermost portion of the cladding 13 can be further increased.

When the fluorine concentration distribution of the cladding 13 (the distribution defined by the distance r along the radial direction and the fluorine concentration) is XF(r), it is preferable, in any small section (a section having a width of 1 μm along the radial direction) of the outer region of the cladding 13, that a differential coefficient XF'(r) of the fluorine concentration distribution XF(r) at the distance r is negative and that the absolute value of the differential coefficient XF'(r) is 30 ppm/μm or more and 600 ppm/μm or less. Note that, the outer region of the cladding 13 satisfies a relationship represented by the following expression (8):

$$r2 + (rc - r2) \times 0.5 \leq r \leq r2 + (rc - r2) \times 0.8 \quad (8),$$

and is defined as an annular region from a position where a distance along the radial direction from the inner peripheral surface of the cladding 13 is 50% of the width of the cladding (rc−r2) to a position where a distance along the radial direction from the inner peripheral surface is 80% of the width of the cladding.

As the absolute value of the differential coefficient XF'(r) is larger, the fluorine concentration in the outermost portion of the cladding 13 is smaller. This is preferable to increase the viscosity of the glass in the outermost portion of the cladding 13. On the other hand, if the absolute value of the differential coefficient XF'(r) is excessively large, the change in the residual stress becomes large along the radial direction. Such an increase in the change in the residual stress leads to non-uniformity of the glass structure, and the transmission loss is increased. Therefore, it is preferable that, in any small section having a width of 1 μm in the outer region of the cladding 13, the differential coefficient XF'(r) is negative and that the absolute value of the differential coefficient XF'(r) is 30 ppm/μm or more and 600 ppm/μm.

The fluorine concentration distribution along the radial direction in the optical fiber can be measured by an electron probe micro analyzer (EPMA). The EPMA irradiates the optical fiber, which is the object to be measured, with an electron beam to measure the intensity of the X-ray generated at that time. By measuring a sample whose fluorine concentration is known in advance (to obtain a calibration curve between the X-ray intensity and the fluorine concentration), the X-ray intensity measured from the optical fiber can be converted into the fluorine concentration.

The stress remaining in the outer region of the cladding 13 (the range in which the distance along the radial direction from the inner peripheral surface of the cladding is 50% or more and 80% or less of the width of the cladding) is preferably a tensile stress. As a result, the tension at the time of drawing can be borne in a wide region of the cladding 13, and the stress in the core 11 can be a compressive stress. Alternatively, the stress in the entire region of the cladding 13 may be a tensile stress. Here, the distribution of the residual stress along the radial direction in the optical fiber can be measured based on the birefringence in the optical fiber using two beams of polarized light orthogonal to each other as disclosed in, for example, Patent Document 3.

The transmission loss of each of the optical fibers 1 and 2 in the present disclosure at a wavelength of 1550 nm is 0.180 dB/km or less, preferably 0.174 dB/km or less, and more preferably 0.170 dB/km or less.

A conventionally known single mode optical fiber (SMF) has an effective area of about 80 $\mu m^2$ at a wavelength of 1550 nm and a cable cutoff wavelength of 1260 nm or less. In addition, a conventionally known non-zero dispersion shifted fiber (NZDSF) has an effective area of about 50 $\mu m^2$ or more and 70 $\mu m^2$ or less at a wavelength of 1550 nm and a cable cutoff wavelength of 1450 nm or less. Unlike these conventional SMF and NZDSF, each of the optical fibers 1 and 2 in the present disclosure preferably has an effective area of 80 $\mu m^2$ or more and 160 $\mu m^2$ or less at a wavelength of 1550 nm and a cable cutoff wavelength of 1530 nm or less.

In each of the optical fibers 1 and 2 in the present disclosure, the refractive index is locally high in the outermost portion of the cladding 13, and the difference between the refractive index of the outermost portion of the cladding 13 and the refractive index of the core is small. When a part of the power of the signal light extends to the vicinity of the outermost portion of the cladding 13, the effective relative refractive index difference between the core 11 and the cladding 13 becomes small. Therefore, it is preferable that most of the power of the signal light is present only in the core 11 and the inner region of the cladding 13 adjacent to the core 11. Furthermore, in the present embodiment, it is preferable that the effective area is larger because the outer diameter of the core 11 is larger, and the larger part of the power of the signal light is present only in the core 11 and the inner region of the cladding 13 adjacent to the core 11. Meanwhile, if the effective area is excessively large, the bending loss easily increases. Therefore, the effective area at a wavelength of 1550 nm is preferably 80 $\mu m^2$ or more and 160 $\mu m^2$ or less.

It is preferable that the cable cutoff wavelength is longer because the power of the signal light in the fundamental mode is more strongly confined in the core 11. On the other hand, in order for the signal light to propagate in the single mode in the C-band (wavelength 1530 or more and 1565 nm or less), the cable cutoff wavelength is preferably 1530 nm or less. The bending loss at wavelengths of 1550 nm and 1625 nm when the optical fiber is wound 100 turns with a bending diameter of 60 mm is preferably 2.0 dB or less. This bending loss is more preferably 0.1 dB or less and most preferably 0.05 dB or less.

Other characteristics of the optical fibers 1 and 2 in the present disclosure may comply with the international recommendations ITU-T G.654.

The material of the core 11 may be pure silica glass. The material of the core 11 may be silica glass containing any one of $GeO_2$, chlorine (a chlorine element), and fluorine (a fluorine element), and may be silica glass containing two or more of these dopants. It is more preferable that the core 11 contains these elements because the viscosity of the core 11 is reduced, and the stress in the core 11 can be a compressive stress. Furthermore, the core 11 containing $GeO_2$ or chlorine makes the refractive index of the core 11 high. This is preferable because the signal light can be more strongly confined in the core 11. However, if the core 11 excessively contains these dopants, the Rayleigh scattering loss due to fluctuation in the concentration of the doped element increases. Therefore, a relative refractive index difference Δcore of the average value of refractive index of the core 11 with respect to pure silica glass preferably fall within the range of −0.2% or more and +0.4% or less. The Δcore is more preferably −0.2% or more and +0.2% or less, and most preferably 0% or more and +0.2% or less.

A chlorine concentration XCl_outer[ppm] in the outermost portion of the core 11 and a maximum value XCl_max [ppm] of the chlorine concentration in the core 11 preferably satisfy a relationship represented by the following expression (9):

$$0 \leq XCl\_outer < 0.8 \times XCl\_max \quad (9).$$

As a result, the change in the viscosity in the boundary surface between the core and the cladding can be controlled to be small. Furthermore, the chlorine concentration may satisfy a relationship represented by the following expression (10):

$$0 \leq XCl\_outer < 0.5 \times XCl\_max \quad (10).$$

It is more preferable if the core 11 contains both $GeO_2$ and chlorine. The Rayleigh scattering loss due to fluctuation in the concentration of $GeO_2$ more easily increases than fluctuation in the concentration of chlorine. However, the core 11 containing both $GeO_2$ and chlorine can increase the refractive index of the core 11, and the signal light can be more strongly confined in the core without excessively doping $GeO_2$. Furthermore, the viscosity of the core 11 can be reduced to increase the stress in the core 11. Preferably, the average value of the concentration of $GeO_2$ contained in the core 11 is 0 ppm or more and 33000 ppm or less (a concentration that increases the relative value of the refractive index variation with respect to the refractive index of pure silica glass by 0 or more and 0.2% or less), and the average value of the concentration of chlorine is 0 ppm or more and 20000 ppm or less (a concentration that increases the relative value of the refractive index variation with respect to the refractive index of pure silica glass by 0% or more and 0.2% or less). More preferably, the average value of the concentration of $GeO_2$ contained in the core is 0 ppm or more and 25000 ppm or less (a concentration that increases the relative value of the refractive index variation with respect to the refractive index of pure silica glass by 0% or more and 0.15% or less), and the average value of the concentration of chlorine is 0 ppm or more and 15000 ppm or less (a concentration that increases the relative value of the refractive index variation with respect to the refractive index of pure silica glass by 0% or more and 0.15% or less).

It is preferable that the radius r1 of the core 11 is larger because the power of the signal light can be more strongly confined in the core 11. Furthermore, it is preferable that a relative refractive index difference Δ1 of the average value of refractive index of the core 11 with respect to the minimum refractive index of the cladding 13 is larger because the power of the signal light can be more strongly confined in the core 11. However, if both the radius r1 and the relative refractive index difference Δ1 are excessively large, the cable cutoff wavelength becomes long, and the signal light does not propagate in the single mode in a signal light wavelength band such as the C-band. Therefore, the radius r1 is preferably 4.0 μm or more and 8.0 μm or less, and the relative refractive index difference Δ1 is preferably 0.1% or more and 0.5% or less. As a result, the above effective area, cable cutoff wavelength, and fiber characteristics can be implemented.

Compared with the configuration of the optical fiber 1 (FIG. 1) including the core 11 and the cladding 13, the configuration of the optical fiber 2 (FIG. 2) further including the depressed portion 12 is more preferable. A relative refractive index difference Δ+ of the average value of refractive index of the core 11 with respect to the depressed portion 12 is preferably 0.2% or more and 0.5% or less. As a result, most of the power of the signal light is confined in the core 11 and the depressed portion 12. That is, the relative refractive index difference Δ1 may be small, and the fluorine concentration in the cladding 13 may be small. At this time, the relative refractive index difference Δ1 may be 0.1% or more and 0.3% or less.

If the ratio r2/r1 of the radius r2 of the depressed portion 12 to the radius r1 of the core 11 is excessively small, the signal light in the fundamental mode leaks to the cladding 13, and the confinement in the core becomes weak. Alternatively, if the ratio r2/r1 is excessively large, light of unnecessary high-order modes is also confined in the core 11 and the depressed portion 12, and the signal light does not propagate in the single mode in the signal light wavelength band. Therefore, the ratio r2/r1 is preferably 2.0 or more and 7.0 or less, and more preferably 2.5 or more and 4.5 or less.

A relative refractive index difference Δ2 of the average value of refractive index of the depressed portion with respect to the minimum refractive index of the cladding 13 is negative. When Δ+ is constant, the high-order mode is easily to be confined if the absolute value of Δ2 is excessively small. That is, the signal light does not propagate in the single mode in the signal light wavelength band. Meanwhile, if the absolute value of Δ2 is excessively large, the signal light in the fundamental mode is cut off, or a loss due to leakage occurs. Therefore, Δ2 is preferably −0.16% or more and −0.02 or less.

A relative refractive index difference Δc_outer of the outermost portion of the cladding 13 with respect to pure silica glass and a relative refractive index difference Δc_min of the minimum refractive index of the cladding 13 with respect to pure silica glass satisfy a relationship represented by the following expression (11):

$$\Delta c\_outer \geq \Delta c\_min \qquad (11).$$

It is more preferable that they satisfy a relationship represented by the following expression (12):

$$\Delta c\_outer \geq 0.8 \times \Delta c\_min \qquad (12).$$

It is further preferable that they satisfy a relationship represented by the following expression (13):

$$\Delta c\_outer \geq 0.5 \times \Delta c\_min \qquad (13).$$

It is most preferable that they satisfy a relationship represented by the following expression (14):

$$\Delta c\_outer \geq 0.3 \times \Delta c\_min \qquad (14).$$

Here, a relative refractive index difference Δcore of the average value of refractive index of the core 11 with respect to pure silica glass is represented by the following expression (15):

$$\Delta core[\%] = 100 \times (n1\_ave - n0)/n1\_ave \qquad (15).$$

A relative refractive index difference Δ1 of the average value of refractive index of the core 11 with respect to the minimum refractive index of the cladding 13 is represented by the following expression (16):

$$\Delta 1[\%] = 100 \times (n1\_ave - nc\_min)/n1\_ave \qquad (16).$$

A relative refractive index difference Δ2 of the average value of refractive index of the depressed portion 12 with respect to the minimum refractive index of the cladding 13 is represented by the following expression (17):

$$\Delta 2[\%] = 100 \times (n2\_ave - nc\_min)/n2\_ave \qquad (17).$$

A relative refractive index difference Δ+ of the average value of refractive index of the core 11 with respect to depressed portion 12 is represented by the following expression (18):

$$\Delta +[\%] = 100 \times (n1\_ave - n2\_ave)/n1\_ave \qquad (18).$$

When the refractive index of the outermost portion of the cladding 13 is nc_outer, the relative refractive index difference Δc_outer of the outermost portion of the cladding 13 with respect to pure silica glass is represented by the following expression (19):

$$\Delta c\_outer = 100 \times (nc\_outer - n0)/nc\_outer \qquad (19).$$

When the minimum refractive index of the cladding 13 is nc_min, the relative refractive index difference Δc_min of the minimum refractive index of the cladding 13 with respect to pure silica glass is represented by the following expression (20):

$$\Delta c\_min = 100 \times (nc\_min - n0)/nc\_min \qquad (20).$$

Figure 3:
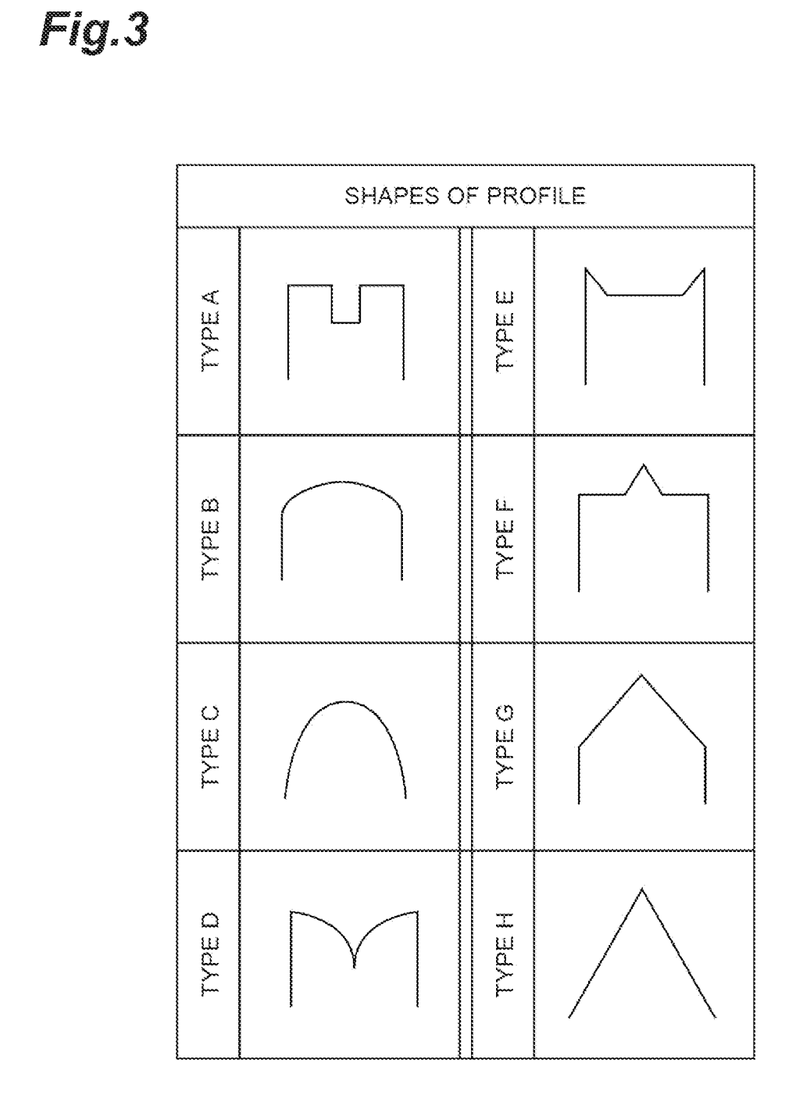
FIG. 3 is a diagram showing refractive index distribution examples of the core of each of the optical fibers 1 and 2.

The core 11 of each of the optical fibers 1 and 2 may have any index of refraction profile, and a type A to type H refractive index profiles as shown in FIG. 3 can be applied to the core 11, for example. Regardless of the refractive index profile, the average value of the refractive index of the core 11 is n1_ave.

Here, the refractive index profile of the core 11 may be an a-th power profile (the type B, the type C, the type G, the type H, or the like in FIG. 3) in which the refractive index n(r) at the radius r[um] is approximated by the expression of:

$$n(r) = n1\_max\left[1 - 2\Delta max\left(\frac{r}{r1}\right)^a\right]^{\frac{1}{2}},$$

$$\Delta max[\%] = 100 \times (n1\_max - n0)/n1\_max.$$

Figure 4:
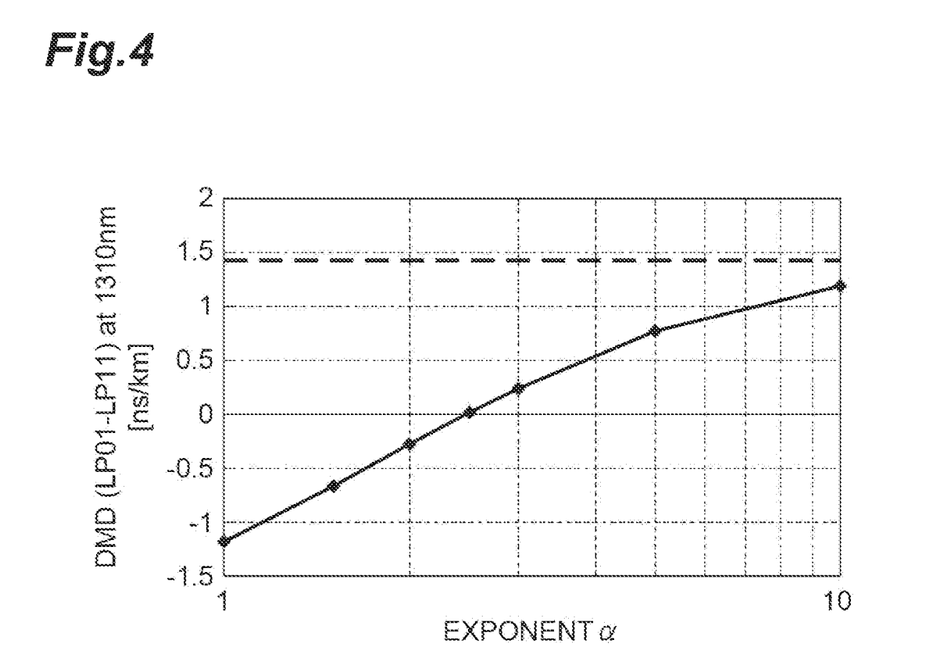
FIG. 4 is a graph showing DMDs in an LP01 mode and an LP11 mode at a wavelength of 1310 nm in various refractive index profiles by varying an exponent α.

Since the optical fiber in the present disclosure has a cable cutoff wavelength of 1530 nm at a maximum, light of two or more modes can propagate in the O-band (wavelength 1260 nm or more and 1360 nm or less). Therefore, the optical fiber in the present disclosure can be applied to mode division multiplexing transmission in which light of a plurality of modes propagates in one fiber. It is preferable that the profile shape of the core 11 has the α-th power because the differential mode delays (DMD) between modes can be reduced and the load of multiple-input and multiple-output (MIMO) processing in the receiver is reduced. FIG. 4 is a graph showing DMDs in an LP01 mode and an LP11 mode at a wavelength of 1310 nm in various refractive index profiles by varying an exponent α as r2/r1=3.8, rc=62.5 μm, and Δ2=−0.06%. Here, Δmax and the core radius r1 are adjusted so that an effective area Aeff is 125 μm² and the cable cutoff wavelength is 1450 nm. This shows that the exponent α is preferably 1 or more and 10 or less in order to keep the absolute value of DMD small. More preferably, the exponent α is 1.5 or more and 5 or less. Most preferably, the exponent α is 2 or more and 4 or less.

Figure 5:
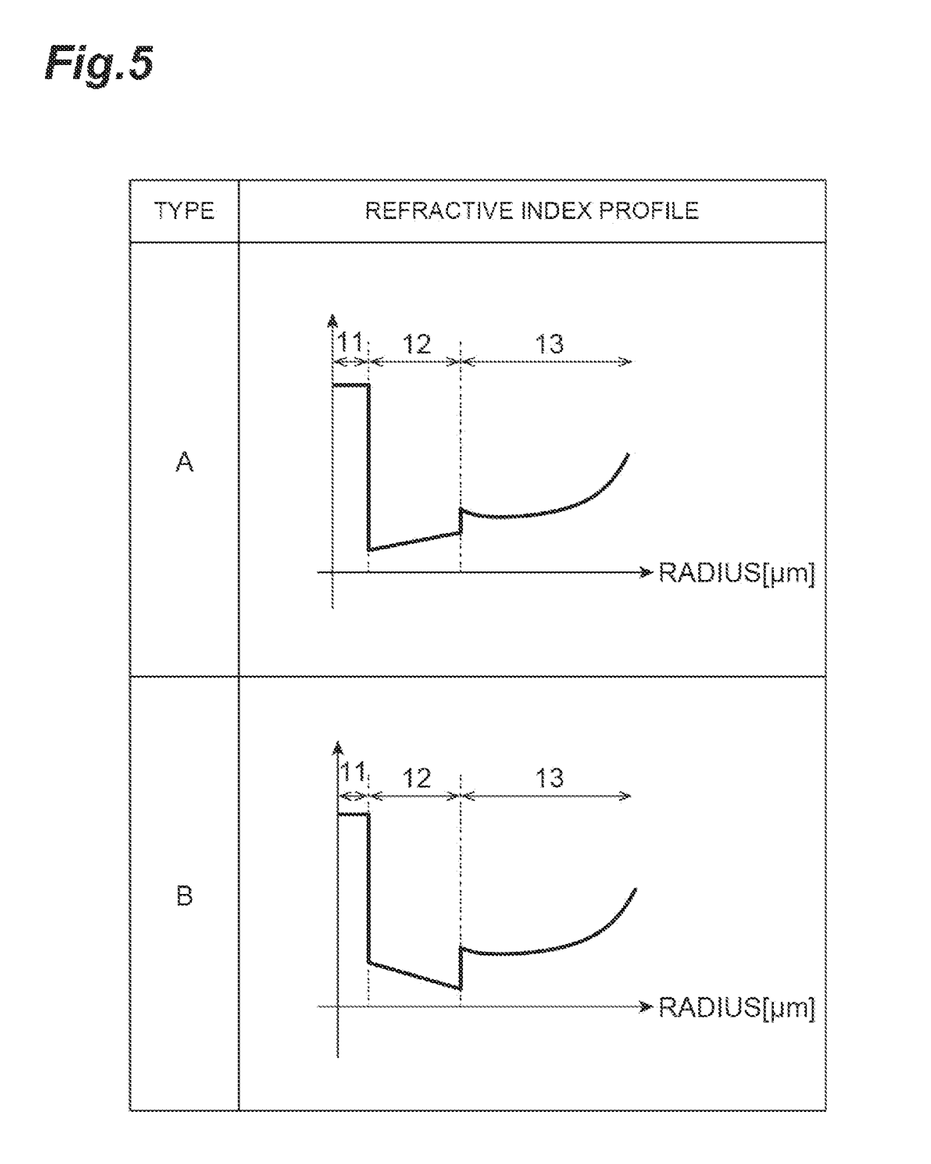
FIG. 5 is a diagram showing a refractive index distribution example of a depressed portion of the optical fiber 2.

Furthermore, the depressed portion 12 of the optical fiber 2 may have any refractive index profile and may have, for example, the type A or type B refractive index profile shown in FIG. 5. Regardless of the refractive index profile, the average value of the refractive index of the depressed portion 12 is n2_ave.

Figure 6:
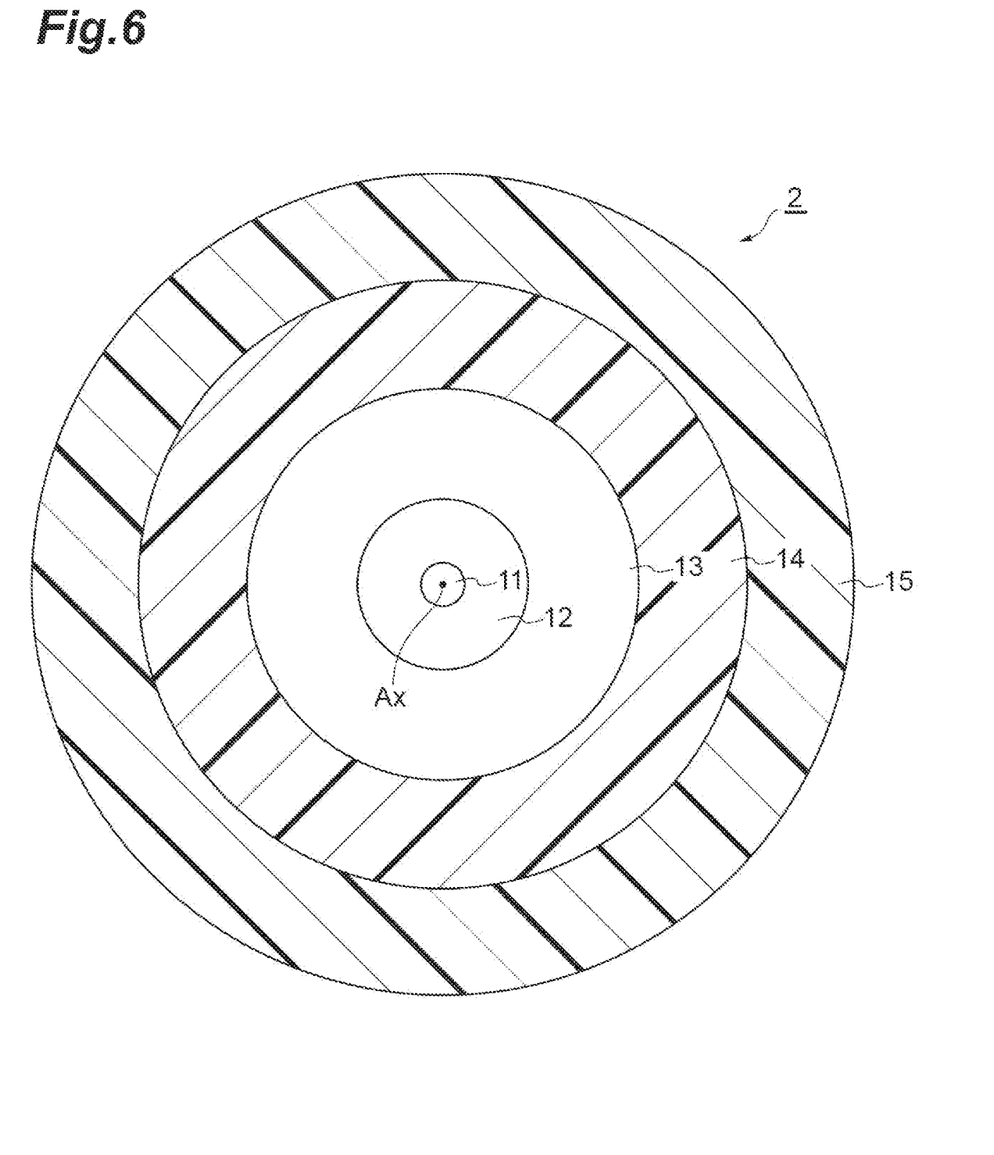
FIG. 6 is a diagram showing a cross-sectional structure of the optical fiber 2 including a resin coating layer.

The radius rc of the cladding 13 falls within the range of 62 µm or more and 63 µm or less. Each of the optical fibers 1 and 2 includes a resin coating layer provided so as to be in contact with the outer peripheral surface of the cladding 13. FIG. 6 is a diagram showing a cross-sectional structure of the optical fiber 2 including the resin coating layer. The resin coating layer has a two-layer structure and includes a primary coating layer 14 provided on the inner side and functioning so that external force is not directly transmitted to the cladding 13, and a secondary coating layer 15 provided on the outside of the primary coating layer 14 functioning to prevent damage. The outer radius of the primary coating layer 14 is 90 µm or more and 105 µm or less, and the outer radius of the secondary coating layer 15 may be 117.7 µm or more and 127.5 µm or less. Alternatively, the outer radius of the primary coating layer 14 is 75 µm or more and 87.5 µm or less, and the outer radius of the secondary coating layer 15 may be 90 µm or more and 105 µm or less.

The optical fibers 1 and 2 in the present disclosure can reduce the transmission loss without the core 11 containing a special element such as an alkali metal element. Furthermore, since the cladding 13 contains fluorine, the refractive index of the cladding 13 is reduced. Therefore, it is not necessary to dope Ge to the core in order to increase the refractive index of the core 11, or the amount of Ge doped to the core 11 can be small. When the optical fiber in the present disclosure is manufactured by drawing an optical fiber preform, it is not necessary to provide a heating furnace directly under the drawing furnace. The optical fiber in the present disclosure can be manufactured inexpensively and easily and reduce the transmission loss.

Figure 7:
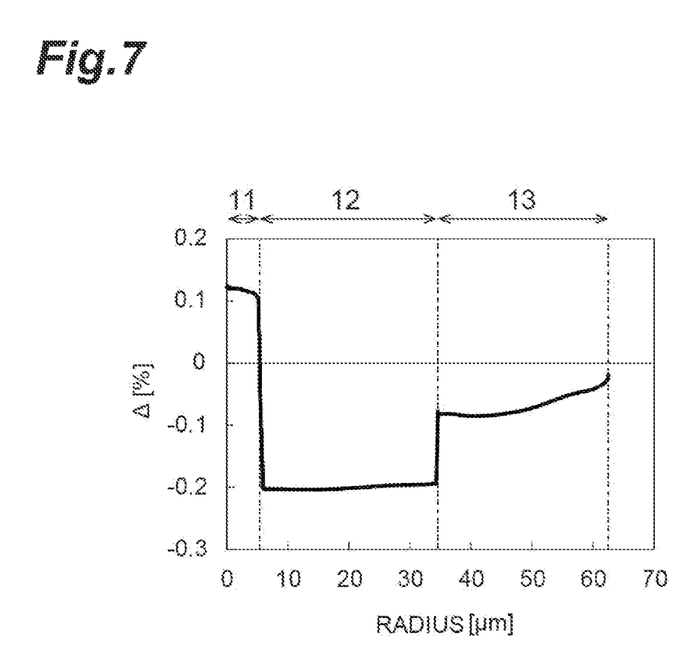
FIG. 7 is a refractive index profile of an optical fiber according to a specific example.
Figure 8:
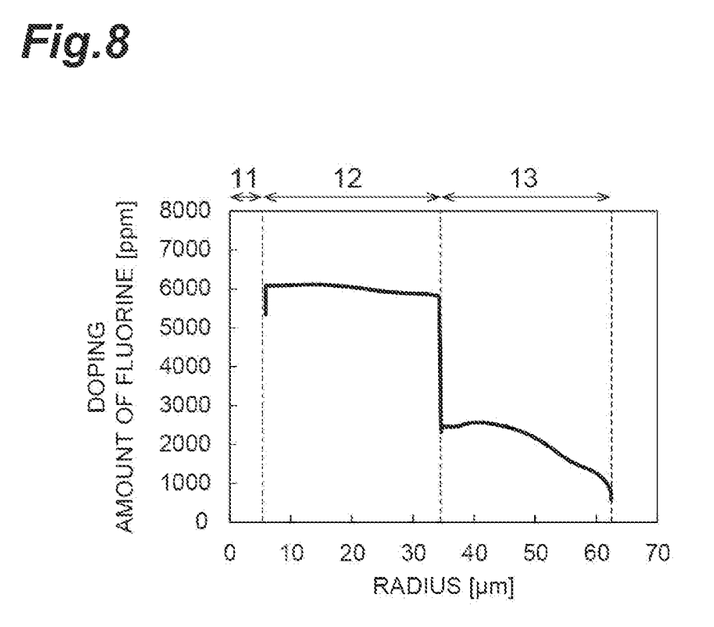
FIG. 8 is a diagram showing a fluorine concentration distribution $XF(r)$ of the optical fiber according to the specific example.
Figure 9:
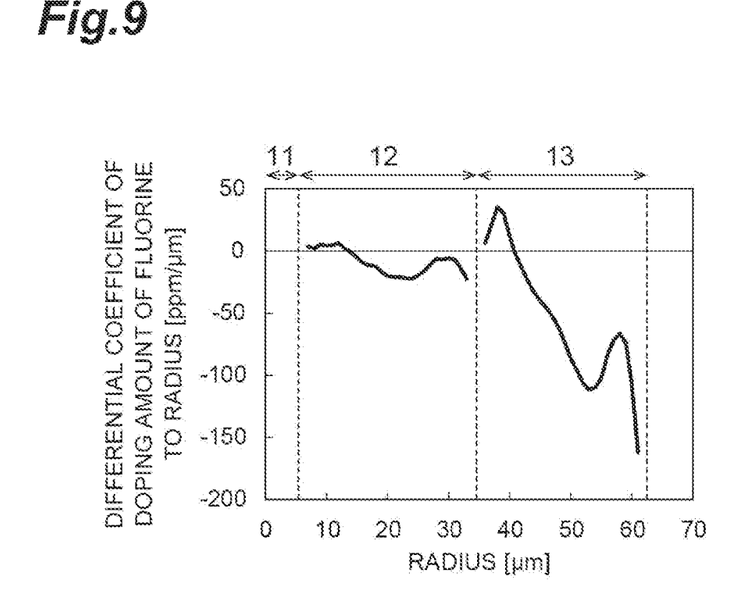
FIG. 9 is a graph plotting a differential coefficient $XF'(r)$ of the fluorine concentration distribution $XF(r)$ of the optical fiber according to the specific example.
Figure 10:
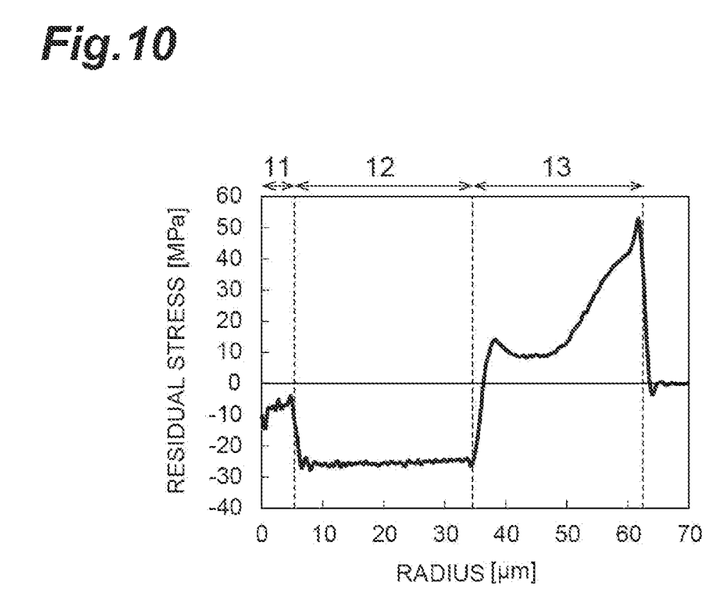
FIG. 10 is a diagram showing a residual stress distribution of the optical fiber according to the specific example.

Next, a specific example of the optical fiber according to the present embodiment will be described. An optical fiber according to a specific example 1 has the same structure as the optical fiber 2 (FIG. 2). FIG. 7 is a diagram showing a refractive index profile of the optical fiber according to the specific example 1. FIG. 8 is a diagram showing the fluorine concentration distribution XF(r) of the optical fiber according to the specific example 1. FIG. 9 is a graph plotting the differential coefficient XF'(r) of the fluorine concentration distribution XF(r) of the optical fiber according to the specific example 1. FIG. 10 is a diagram showing a residual stress distribution of the optical fiber according to the specific example 1. In FIG. 10, a positive residual stress means a tensile stress, and a negative residual stress means a compressive stress.

Structural parameters of the optical fiber according to the specific example 1 are set as follows: r1=5.4 µm, r2/r1=6.4, rc=62.5 µm, Δcore=0.11%, Δ1=0.20%, Δ2=−0.11%, and Δ+=0.31%. The core is comprised of silica glass containing chlorine. The cladding is comprised of silica glass containing fluorine. XFc_max is 2560 ppm, and XFc_outer is 570 ppm. The absolute value of the differential coefficient XF'(r) of the fluorine concentration distribution XF(r) in the outer region of the cladding (the range in which the distance along the radial direction from the inner peripheral surface of the cladding is 50% or more and 80% or less of the width of the cladding) is 62 ppm/µm or more and 115 ppm/µm or less. The stress in the entire region of the cladding is the tensile stress and the stress in the entire region of the core is the compressive stress. The transmission loss at a wavelength of 1550 nm is 0.168 dB/km. The effective area at a wavelength of 1550 nm is 109 µm². The cable cutoff wavelength is 1417 nm. The bending loss at wavelengths of 1550 nm and 1625 nm when the optical fiber is wound 100 turns with a diameter of 60 mm is 0.05 dB or less. The other fiber characteristics comply with the international recommendations TTU-T G.654.

An optical fiber according to a specific example 2 also has the same structure as the optical fiber 2 (FIG. 2). Structural parameters of the optical fiber according to the specific example 2 are set as follows: r1=6.5 µm, r2/r1=3.8, rc=62.5 µm, Δcore=0.16%, Δ1=0.24%, Δ2=−0.06%, and 4+=0.30%. The core is comprised of silica glass doped with GeO₂ and chlorine. The average value of the concentration of GeO₂ doped to the core is 13500 ppm. The average value of the concentration of chlorine doped to the core is 8000 ppm. The cladding contains fluorine. XFc_max is 2400 ppm, and XFc_outer is 1020 ppm. The value of |XF(r)| in the outer region of the cladding (the range in which the distance along the radial direction from the inner peripheral surface of the cladding is 50% or more and 80% or less of the width of the cladding) is 30 ppm/µm or more and 152 ppm/µm or less. The stress in the entire region of the cladding is the tensile stress and the stress in the entire region of the core is the compressive stress. The transmission loss at a wavelength 1550 nm is 0.170 dB/km, the effective area Aeff at a wavelength 1550 nm is 125 µm², the cable cutoff wavelength is 1453 nm, the bending loss at wavelengths 1550 nm and 1625 nm when the optical fiber is wound 100 turns with a diameter of 60 mm is 0.05 dB or less. The other fiber characteristics comply with the international recommendations ITU-T G.654.

REFERENCE SIGNS LIST 1, 2 . . . Optical fiber; 11 . . . Core; 12 . . . Depressed portion; 13 . . . Cladding; 14 . . . Primary coating layer; and 15 . . . Secondary coating layer.

The invention claimed is:
1. An optical fiber comprising:
a core mainly comprised of silica glass and extending along a fiber axis; and
a cladding mainly comprised of silica glass, the cladding surrounding an outer peripheral surface of the core and having a refractive index lower than a refractive index of the core, wherein
an average value n1_ave of the refractive index of the core, a minimum value nc_min of the refractive index of the cladding, and a refractive index n0 of pure silica glass satisfy relationships of:

$n1\_ave > nc\_min$; and $nc\_min < n0$, the cladding contains fluorine,
a fluorine concentration in the cladding is adjusted to be minimum in an outermost portion of the cladding,
a fluorine concentration distribution XF(r) is determined by the fluorine concentration in the cladding and a distance r along a radial direction of the optical fiber from the fiber axis, in a cross section of the optical fiber perpendicular to the fiber axis, and a differential coefficient XF'(r) of the fluorine concentration distribution XF(r) at the distance r is negative, and an absolute value of the differential coefficient XF'(r) is 30 ppm/μm or more and 600 ppm/μm or less in any small section, the small section having a width of 1 μm defined along the radial direction, in an outer region of the cladding, the outer region being defined as an annular region from a position where a distance along the radial direction from an inner peripheral surface of the cladding is 50% of a width of the cladding to a position where a distance along the radial direction from the inner peripheral surface is 80% of the width of the cladding.

2. The optical fiber according to claim 1, wherein a fluorine concentration XFc_outer in the outermost portion of the cladding and a maximum value XFc_max of the fluorine concentration in the cladding satisfy a relationship of:

$$0 \leq XFc\_outer < 0.8 \times XFc\_max.$$

3. The optical fiber according to claim 1, wherein a stress acting perpendicularly to the cross section is a tensile stress, in the outer region of the cladding.

4. The optical fiber according to claim 1, wherein a stress acting perpendicularly to a cross section of the optical fiber perpendicular to the fiber axis in an outer region of the cladding, the outer region being defined as an annular region from a position where a distance along a radial direction of the optical fiber from an inner peripheral surface of the cladding is 50% of a width of the cladding to a position where a distance along the radial direction from the inner peripheral surface is 80% of the width of the cladding, is a tensile stress.

5. The optical fiber according to claim 1, wherein the optical fiber has an effective area of 80 μm² or more and 160 μm² or less at a wavelength of 1550 nm.

6. The optical fiber according to claim 1, wherein the optical fiber has a cable cutoff wavelength of 1530 nm or less.

7. The optical fiber according to claim 1, wherein the core contains at least one of $GeO_2$ and chlorine.

8. The optical fiber according to claim 7, wherein the core contains at least the chlorine, and a chlorine concentration XCl_outer in an outermost portion of the core and a maximum value XCl_max of the chlorine concentration in the core satisfy a relationship of:

$$0 \leq XCl\_outer < 0.8 \times XCl\_max.$$

9. The optical fiber according to claim 7, wherein the core contains both the $GeO_2$ and the chlorine, an average value of a concentration of the $GeO_2$ contained in the core is 33000 ppm or less, and an average value of a concentration of a chlorine element contained in the core is 20000 ppm or less.

10. The optical fiber according to claim 1, wherein the core contains fluorine.

11. The optical fiber according to claim 1, wherein a relative refractive index difference Δcore of an average value of refractive index of the core with respect to pure silica glass is −0.2% or more and +0.4% or less.

12. The optical fiber according to claim 1, wherein a relative refractive index difference Δ1 of an average value of refractive index of the core with respect to a minimum refractive index of the cladding is 0.1% or more and 0.5% or less.

13. The optical fiber according to claim 1, wherein an exponent α of a refractive index profile of the core is 1 or more and 10 or less.

14. The optical fiber according to claim 1, further comprising a depressed portion provided between the core and the cladding, wherein an average value n2_ave of a refractive index of the depressed portion satisfies a relationship of:

$$n2\_ave \leq nc\_min.$$

15. The optical fiber according to claim 14, wherein a relative refractive index difference Δ+ of an average value of refractive index of the core with respect to the depressed portion is 0.2% or more and 0.5% or less.

16. The optical fiber according to claim 14, wherein a relative refractive index difference Δ2 of an average value of refractive index of the depressed portion with respect to a minimum refractive index of the cladding is −0.16% or more and −0.02% or less, and a ratio r2/r1 of a radius r2 of the depressed portion to a radius r1 of the core is 2.0 or more and 7.0 or less.

* * * * *